(12) United States Patent
Subramanian et al.

(10) Patent No.: US 9,871,800 B2
(45) Date of Patent: Jan. 16, 2018

(54) SYSTEM AND METHOD FOR PROVIDING APPLICATION SECURITY IN A CLOUD COMPUTING ENVIRONMENT

(71) Applicant: ORACLE INTERNATIONAL CORPORATION, Redwood Shores, CA (US)

(72) Inventors: Velmurugan Subramanian, Belmont, CA (US); Nilesh Junnarkar, Palo Alto, CA (US)

(73) Assignee: ORACLE INTERNATIONAL CORPORATION, Redwood Shores, CA (US)

( * ) Notice: Subject to any disclaimer, the term of this patent is extended or adjusted under 35 U.S.C. 154(b) by 0 days.

(21) Appl. No.: 14/610,524

(22) Filed: Jan. 30, 2015

(65) Prior Publication Data

US 2015/0222620 A1  Aug. 6, 2015

Related U.S. Application Data

(60) Provisional application No. 61/934,625, filed on Jan. 31, 2014.

(51) Int. Cl.
*G06F 21/00* (2013.01)
*H04L 29/06* (2006.01)

(52) U.S. Cl.
CPC .................. *H04L 63/102* (2013.01)

(58) Field of Classification Search
CPC ......... G06F 21/52; G06F 21/54; H04L 29/06; H04L 63/102
USPC .......................................................... 726/22
See application file for complete search history.

(56) References Cited

U.S. PATENT DOCUMENTS

| 8,706,881 | B2 | 4/2014 | Ramu et al. |
| 8,881,092 | B2 | 11/2014 | Cope et al. |
| 8,886,777 | B2 | 11/2014 | Salsburg |
| 8,938,800 | B2 | 1/2015 | Bhargava |
| 9,378,014 | B2 | 6/2016 | Wilson et al. |
| 9,459,862 | B2 | 10/2016 | Araya et al. |

(Continued)

OTHER PUBLICATIONS

Burg, et al., "A Self-Adaptive Deployment Framework for Service-Oriented Systems", ACM, pp. 208-217, 2011.

(Continued)

*Primary Examiner* — Yogesh Paliwal
(74) *Attorney, Agent, or Firm* — Tucker Ellis LLP

(57) ABSTRACT

In accordance with an embodiment, described herein is a system and method for providing application security in a cloud computing or other environment. A plurality of hot-spot configurations define API usages which, for security reasons, are of interest to be monitored at runtime, such as invocations of particular methods that are likely to be used to attempt unauthorized access. Upon a user application being received for deployment to the cloud environment, an application compiler determines, for API usages expressed as method invocations within the source code of the application, one or more hot-spot configurations and associated policies or actions. The application compiler can then inject the user application to provide a security manager that, during runtime, monitors the methods and values invoked, and communicates with one or more security extensions to grant or deny access.

20 Claims, 12 Drawing Sheets

(56) References Cited

U.S. PATENT DOCUMENTS

| | | | |
|---|---|---|---|
| 2008/0016339 A1* | 1/2008 | Shukla | G06F 21/53 |
| | | | 713/164 |
| 2009/0282480 A1* | 11/2009 | Lee | G06F 21/55 |
| | | | 726/22 |
| 2014/0075427 A1 | 3/2014 | Pallamreddy | |
| 2014/0283110 A1 | 9/2014 | Quong | |
| 2015/0200968 A1 | 7/2015 | Bhargava | |
| 2017/0003960 A1 | 1/2017 | Subramanian et al. | |

OTHER PUBLICATIONS

Zoghi, et al,. "Designing Adaptive Applications Deployed on Cloud Environments", ACM Transactions on Autonomous and Adaptive Systems, vol. 10, No. 4, Article 25, pp. 1-26, Jan. 2016.
United States Patent and Trademark Office, Office Action dated Jul. 17, 2017 for U.S. Appl. No. 15/200,994, 18 pages.

* cited by examiner

```
<invoke-static action-id="POLICY-ID-100" messaged-id="System.exit() can not be executed on the cloud.">
    <clazz>java.lang.System</clazz>
    <method all-overloads="true">
        <methodname>exit</methodname>
    </method>
    <runtime-action>
        <deny-replace/>
    </runtime-action>
</invoke-static>
```

Example Hot-Spot Configuration 304

FIGURE 10

```
public static void main(String s[]) throws Exception {
System.out.println("About to exit ....");
if (s.length != 0) {
System.exit(0);
} else {
System.out.println("Normal exit.");
}
System.out.println("Yes normal");
}
```

Example Input Source Code 308

FIGURE 11

```
main([Ljava/lang/String;)V
00000 String    . : GETSTATIC java/lang/System.out : Ljava/io/PrintStream;
00001 String    . : PrintStream : LDC "About to exit ...."
00002 String    . : PrintStream String : INVOKEVIRTUAL java/io/PrintStream.println (Ljava/lang/string;)V
00003 String    . : ALOAD 0
00004 String    . : String : ARRAYLENGTH
00005 String    . : I : IFEQ L0
00006 String    . : ICONST_0
00007 String    . : INVOKESTATIC test/GeneratedGlueCode.__deny_POLICY_ID_100 (I)V
00008 String    . : GOTO L1
00009 String    . : L0
00010 String    . : FRAME SAME
00011 String    . : GETSTATIC java/lang/System.out : Ljava/io/PrintStream;
00012 String    . : PrintStream : LDC "Normal exit."
00013 String    . : PrintStream String : INVOKEVIRTUAL java/io/PrintStream.println (Ljava/lang/string;)V
```

Example Instrumented Code 312

FIGURE 12

```
/*
* This file was auto generated by Oracle JavaCloud tools.
*/
// Generated On:Mon Apr 29 13:32:16 PDT 2013
package test;
public class GeneratedGlueCode{
public static void __deny_POLICY_ID_100(int arg0){
    throw new RuntimeException("System.exit() cannot be executed on the cloud.");
}
}
```

Example Security Manager Glue Code 316

FIGURE 13

```
<!-- Global Properties-->
<properties>
<property name="dis-allowed-properties">
<value>java.home,java.security.policy,user.home</value>
</property>
</properties>
<invoke-static action-id="POLICY-ID-120" messaged-id="specific properties not allowed.">
<clazz>java.lang.System</clazz>
<method all-overloads="true">
<methodname>getProperty</methodname>
</method>
<properties>
<property name="dis-allowed-properties">
<value>${dis-allowed-properties}</value> <!-- value resolved from the global properties -->
</property>
</properties>
<runtime-action>
<forward>
<runtime-forward-class factory="true">
<clazz>oracle.cloud.jcs.scanning.impl.extension.SystemPropertyValidator</clazz>
</runtime-forward-class>
</forward>
</runtime-action>
</invoke-static>
```

Example Hot-Spot Configuration 320

SYSTEM AND METHOD FOR PROVIDING APPLICATION SECURITY IN A CLOUD COMPUTING ENVIRONMENT

CLAIM OF PRIORITY

This application claims the benefit of priority to U.S. Provisional Patent Application No. 61/934,625, titled "SYSTEM AND METHOD FOR PROVIDING APPLICATION DEPLOYMENT SECURITY IN A CLOUD ENVIRONMENT", filed Jan. 31, 2014; and is related to U.S. patent application Ser. No. 14/010,846, titled "SYSTEM AND METHOD FOR PROVIDING WHITELIST FUNCTIONALITY FOR USE WITH A CLOUD COMPUTING ENVIRONMENT", filed Aug. 27, 2013, each of which above applications are herein incorporated by reference.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

FIELD OF INVENTION

Embodiments of the invention are generally related to cloud computing and software application development, and are particularly related to a means for providing application security in a cloud computing or other environment.

BACKGROUND

The term "cloud computing" is generally used to describe a computing model which enables on-demand access to a shared pool of computing resources, such as computer servers, software applications, and services, and which allows for provisioning of applications and resources with minimal management effort or service provider interaction. Examples of such environments include Oracle Cloud, which generally provides a comprehensive set of cloud services that enables software developers to build and deploy applications that can be accessed via the cloud.

However, security issues can arise when a cloud environment includes support for third-party development frameworks, such as Spring, Hibernate, or Wicket, which perform custom classloading. Although functionalities such as Java security manager can enforce permissions granted to classes, including allowing specific classes running within a runtime to permit or not permit certain runtime operations, a third-party framework may allow a user to define an application class with a protection domain that includes all available permissions, or that performs injections into private fields using reflections, which in turn requires the system to grant, e.g., Reflect or Runtime permissions. A malicious user could potentially leverage these granted permissions to gain unauthorized access to environment APIs. A standard Java security manager is unable to defend against such attacks.

Although functionality such as API whitelisting can be useful in addressing various circumstances, it may not fully address those situations in which the cloud environment is managed by one party, while the application being deployed to it is untrusted, particularly when the application is dynamically created. These are some examples of the types of environment in which embodiments of the invention can be used.

SUMMARY

In accordance with an embodiment, described herein is a system and method for providing application security in a cloud computing or other environment. A plurality of hot-spot configurations define API usages which, for security reasons, are of interest to be monitored at runtime, such as invocations of particular methods that are likely to be used to attempt unauthorized access. Upon a user application being received for deployment to the cloud environment, an application compiler determines, for API usages expressed as method invocations within the source code of the application, one or more hot-spot configurations and associated policies or actions. The application compiler can then inject the user application to provide a security manager that, during runtime, monitors the methods and values invoked, and communicates with one or more security extensions to grant or deny access.

BRIEF DESCRIPTION OF THE FIGURES

FIG. 10 illustrates an example hot-spot configuration, in accordance with an embodiment.

FIG. 11 illustrates an example input source code, in accordance with an embodiment.

FIG. 12 illustrates an example instrumented code, in accordance with an embodiment.

FIG. 13 illustrates an example security manager glue code, in accordance with an embodiment.

FIG. 14 illustrates an example hot-spot configuration which supports use of forwarding, in accordance with an embodiment.

DETAILED DESCRIPTION

As described above, cloud computing environments such as Oracle Cloud generally provide a comprehensive set of cloud services that enables software developers to build and deploy applications that can then be accessed via the cloud.

However, security issues can arise when the environment includes support for third-party development frameworks, such as Spring, Hibernate, or Wicket, which perform custom classloading, since a malicious user could potentially define an application class with a protection domain that includes all available permissions, or otherwise leverage granted permissions to gain unauthorized access to environment APIs. A standard Java security manager is unable to defend against such attacks.

To address this, in accordance with an embodiment, described herein is a system and method for providing application security in a cloud computing or other environment.

Cloud Computing Environment

Figure 1:
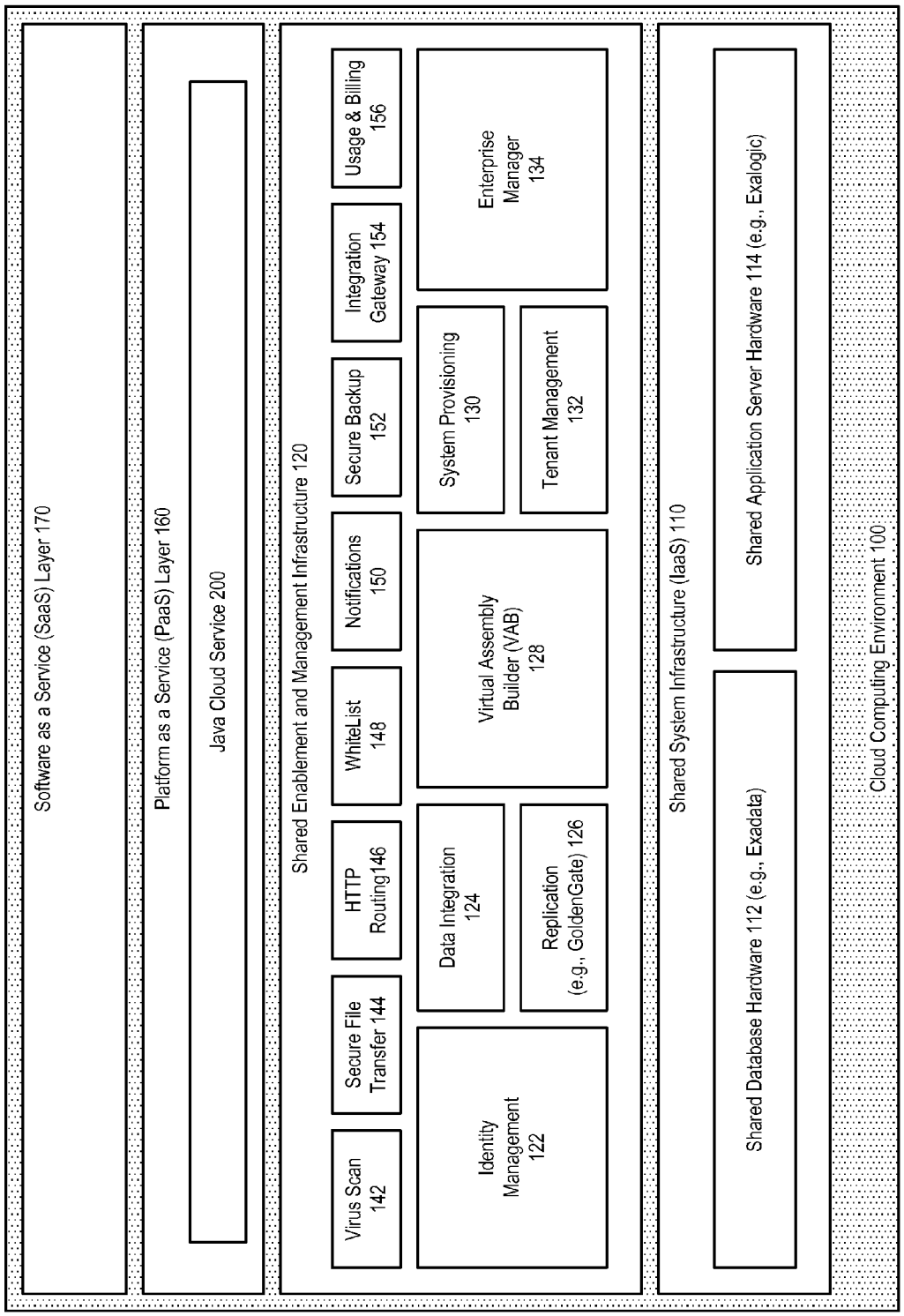
FIG. 1 illustrates an exemplary cloud computing environment, in accordance with an embodiment.

FIG. 1 illustrates an exemplary cloud computing environment, in accordance with an embodiment.

As shown in FIG. 1, in accordance with an embodiment, a cloud computing environment (also referred to herein as a cloud environment, or cloud) 100 can generally include a combination of one or more shared Infrastructure as a Service (IaaS) 110, Platform as a Service (PaaS) 160, and/or Software as a Service (SaaS) 170 layers, which can be delivered as service layers for use by consumers, depending on the cloud computing model being used.

In accordance with an embodiment, the IaaS layer can include, for example, a shared database hardware (e.g., an Exadata machine) 112, and/or a shared application server hardware (e.g., an Exalogic machine) 114; while the PaaS layer can include one or more PaaS services, such as a Java cloud service 200; and the SaaS layer can include one or more SaaS services, such as enterprise applications.

In accordance with an embodiment, the cloud computing environment can also include a shared enablement and management infrastructure 120 which includes tools that support the service layers, for example, identity management 122, data integration 124, replication 126, virtual assembly builder 128, system provisioning 130, tenant management 132, enterprise manager 134, virus scan 142, secure file transfer 144, HTTP routing 146, whitelist 148, notifications 150, secure backup 152, integration gateway 154, and/or usage & billing 156 components.

Cloud Services

In accordance with an embodiment, the cloud computing environment can include a cloud service component (for example, a Java cloud service) which enables the creation of cloud service instances (for example, Java services), for use in provisioning and deployment of software applications.

Figure 2:
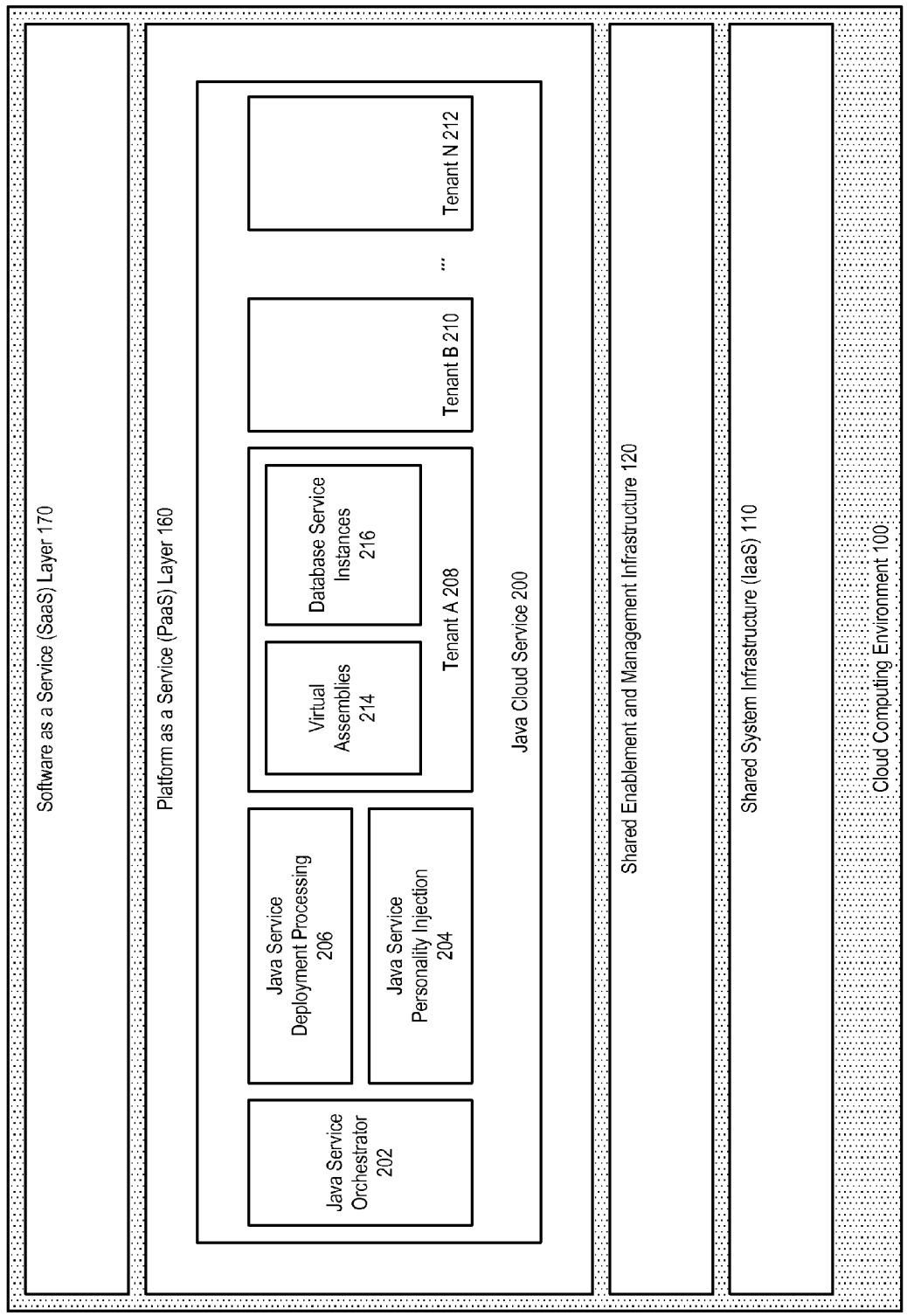
FIG. 2 illustrates an exemplary cloud computing environment which includes a Java cloud service component, in accordance with an embodiment.

FIG. 2 illustrates an exemplary cloud computing environment which includes a Java cloud service component, in accordance with an embodiment.

As shown in FIG. 2, in accordance with an embodiment, the Java cloud service component can include a Java service orchestrator 202, and one or more components for Java service personality injection 204, Java service deployment processing 206, and creation of tenant instances 208, 210, 212, each with one or more virtual assemblies 214 and database service instances 216.

Additional resources and services, for example a database service, can be associated with a particular service instance, for use by applications deployed to that service instance, which can then run in the cloud similarly to how they might run in a traditional (non-cloud) application server environment.

During an application provisioning phase, the cloud service can also call upon the enablement and management infrastructure to orchestrate various steps of the provisioning process, for example scanning the user application for viruses, or validating the application's API invocations against a whitelist of acceptable API calls.

Application Compilation and Deployment

However, as described above, functionality such as API whitelisting may not fully address those situations in which the cloud environment is managed by one party, while the application being deployed to it is untrusted, particularly when the application is dynamically created.

To address this, in accordance with an embodiment, described herein is a system and method for providing application security in a cloud computing or other environment.

In accordance with an embodiment, a plurality of hot-spot configurations define API usages which, for security reasons, are of interest to be monitored at runtime, such as invocations of particular methods that are likely to be used to attempt unauthorized access.

Upon a user application being received for deployment to the cloud environment, an application compiler determines, for API usages expressed as method invocations within the source code of the application, one or more hot-spot configurations and associated policies or actions. The application compiler can then inject the user application to provide a security manager that, during runtime, monitors the methods and values invoked, and communicates with one or more security extensions to grant or deny access.

Figure 3:
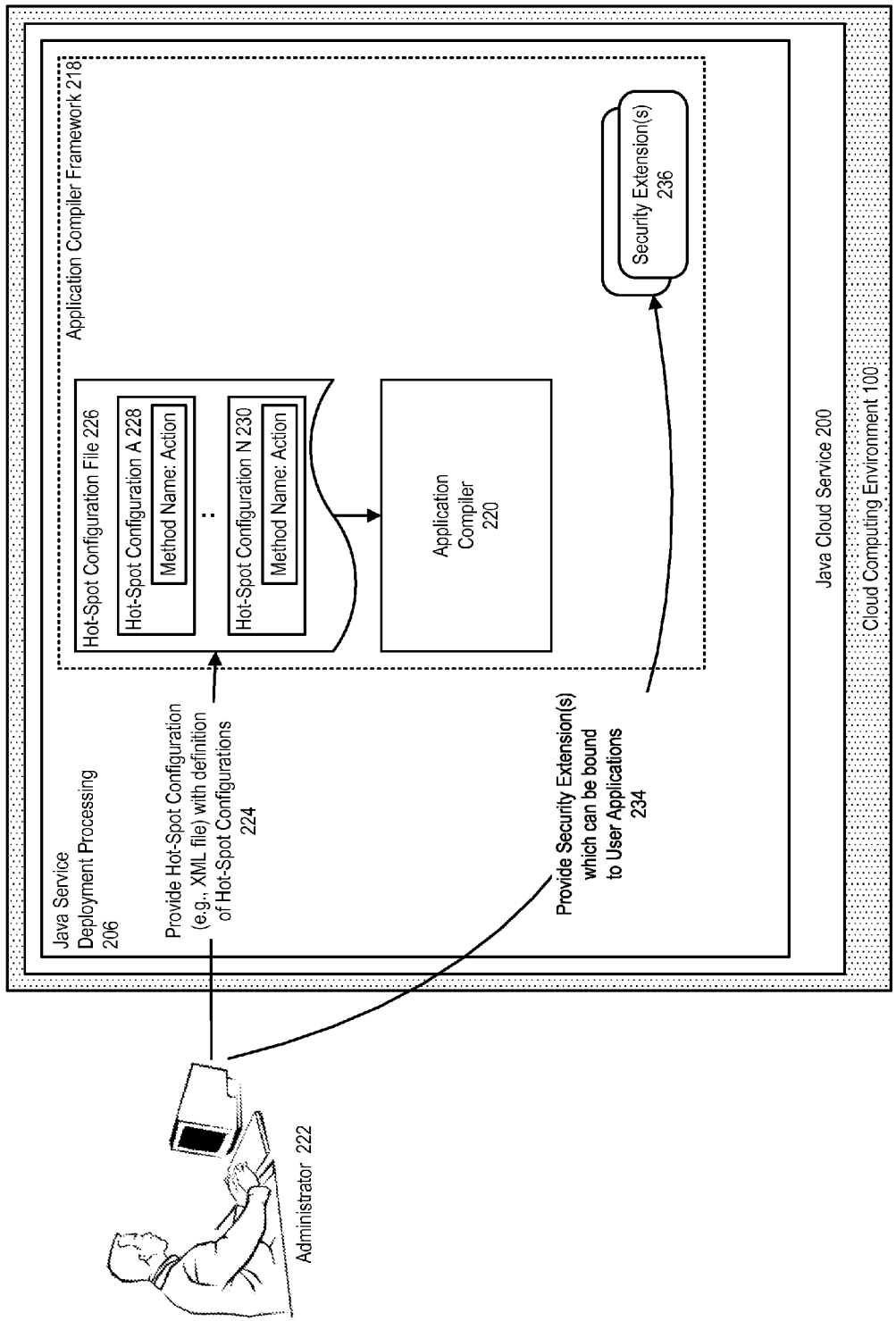
FIG. 3 illustrates a system for providing application deployment security in a cloud computing environment, including an application compiler, in accordance with an embodiment.

FIG. 3 illustrates a system for providing application deployment security in a cloud computing environment, including an application compiler, in accordance with an embodiment.

As shown in FIG. 3, in accordance with an embodiment, an application compiler framework 218 can be provided which includes an application compiler 220, or compiler tool.

An administrator 222 can provide 224 a hot-spot configuration file 226, for example in XML or another format, which includes one or more hot-spot configurations, including in this example a hot-spot configuration A228, and a hot-spot configuration N 230.

In accordance with an embodiment, hot-spots represent API usages which, for security reasons, are of interest to be monitored at runtime, such as invocations of particular methods that are likely to be used to attempt unauthorized access. Each hot-spot configuration can be associated with an owner and/or method signature, and can define an API usage within a user application which is to be monitored in the application runtime, together with a particular policy or set of actions to be associated with that API usage.

In accordance with an embodiment, the administrator can also provide 234 one or more security extensions 236, which can be registered with the compiler framework and bound to user applications at runtime. Different types of extensions can be provided, for later selection and binding with the user application runtime, and can operate according to different strategies to enforce different types of security and address different needs.

For example, a security extension can be provided that injects dynamically loaded bytes (through, e.g., a defineClass method of the ClassLoader); while a different utility-like extension may simply redirect messages written to stdout (System.out.println).

Together, the set of extensions can be used to control security within a cloud or other environment, including any Java environment, in a manner that is both extensible, and less susceptible to attack by a malicious user. In accordance with an embodiment, the system can also operate with, and supplement or defend the operation of, existing security components, for example standard Java security managers. For example, the system can help defend a standard Java security manager against a user attempting to gain unauthorized access to environment APIs by defining an application class with a protection domain that includes all available permissions.

Figure 4:
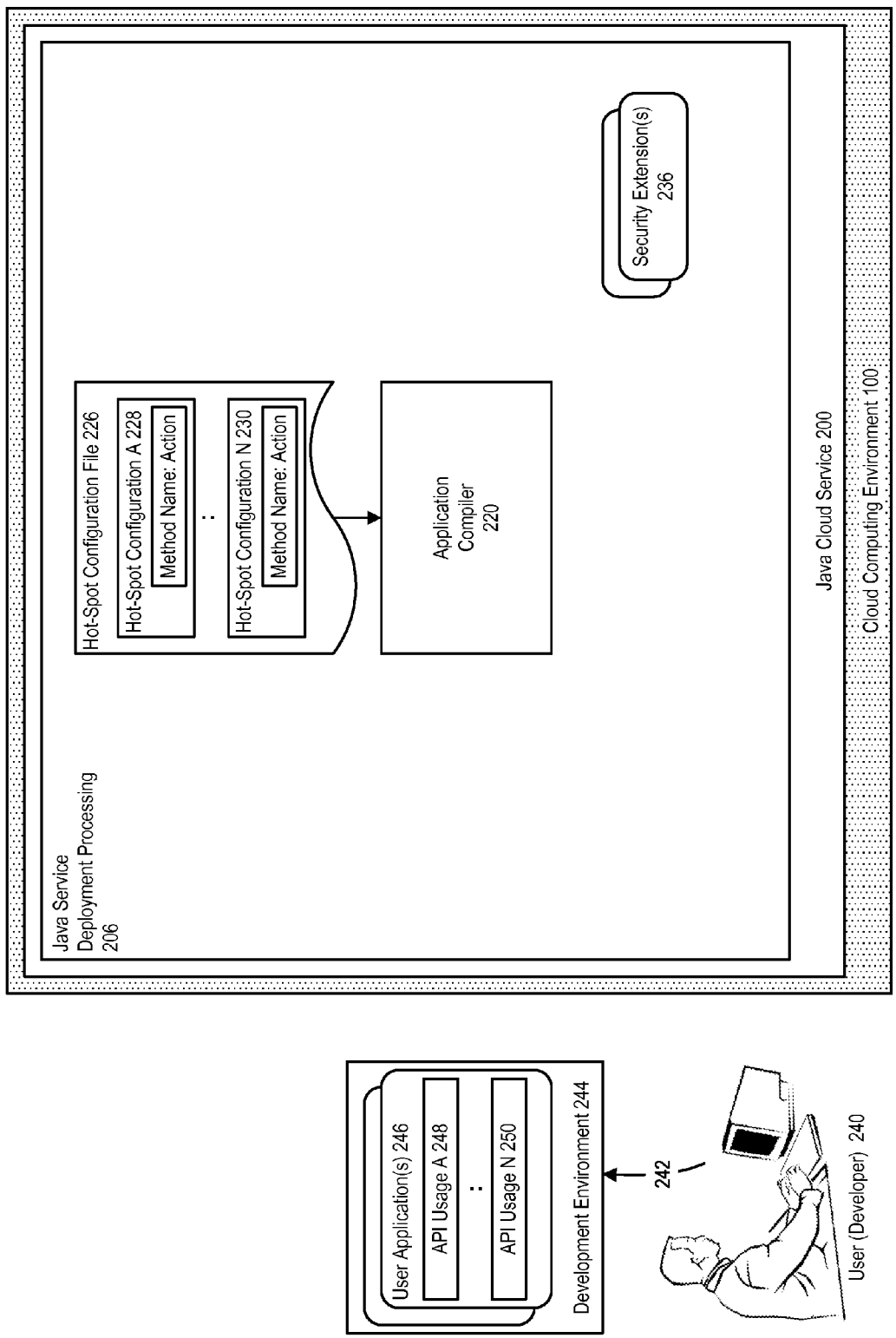
FIG. 4 further illustrates a system for providing application deployment security, in accordance with an embodiment.

FIG. 4 further illustrates a system for providing application deployment security, in accordance with an embodiment.

As shown in FIG. 4, in accordance with an embodiment, a development environment 244 can be used, by a developer or other user 240, to develop 242 a user application 246 which includes one or more API usages, including in this example, an API usage A248, and an API usage N 250.

Figure 5:
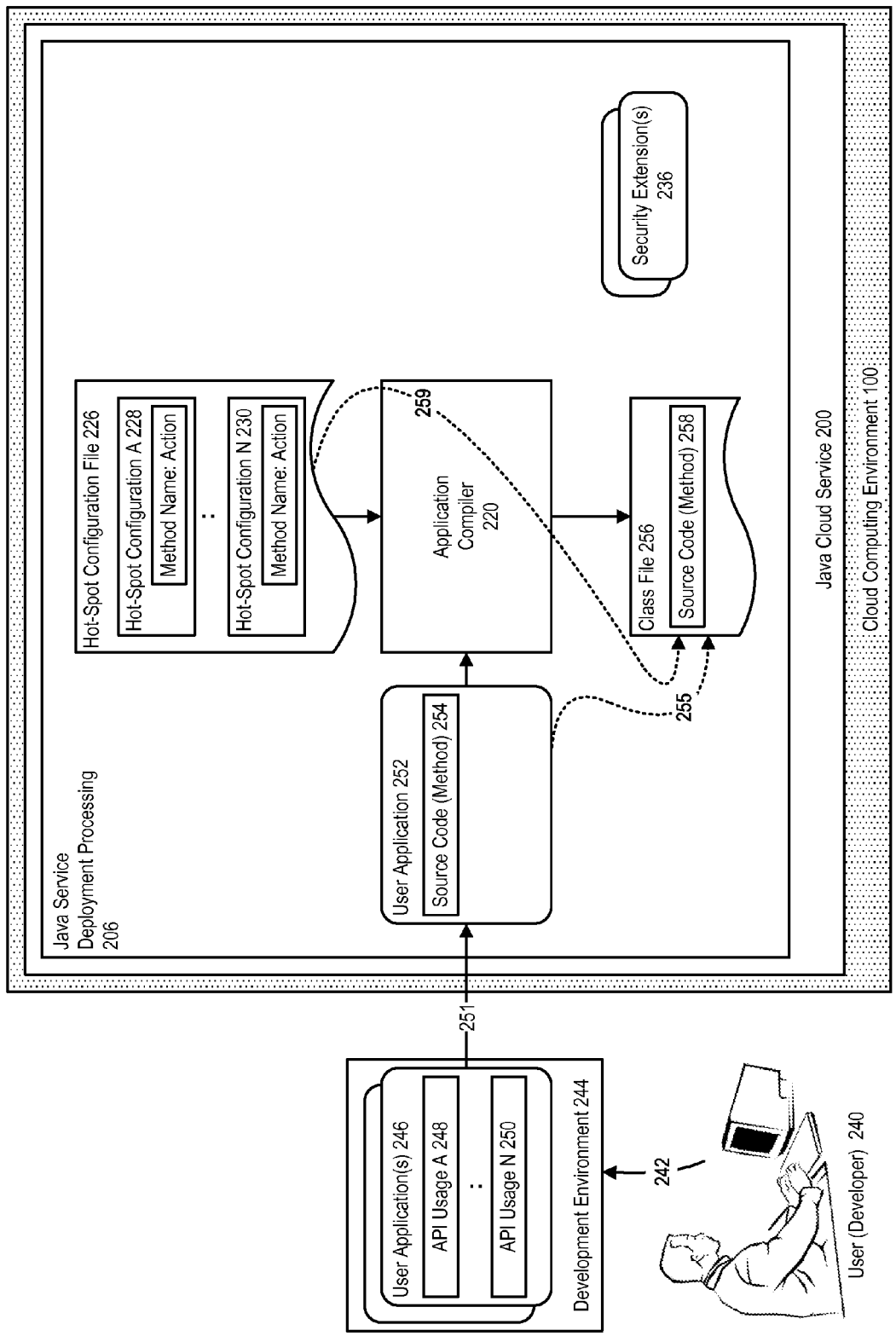
FIG. 5 further illustrates a system for providing application deployment security, in accordance with an embodiment.

FIG. 5 further illustrates a system for providing application deployment security, in accordance with an embodiment.

As shown in FIG. 5, in accordance with an embodiment, the user can provide 251 those user applications which they may have developed within the development environment, to the Java service deployment processing component, to be deployed to the cloud computing environment.

For example, a user application 252 can be received as input into the Java service deployment processing component, wherein the user application includes one or more API usages expressed as method invocations 254 within the source code of the user application. The input source code can be provided 255 as a class file 256 that includes the method source code 258, which the application compiler can then access 259 during compilation.

Figure 6:
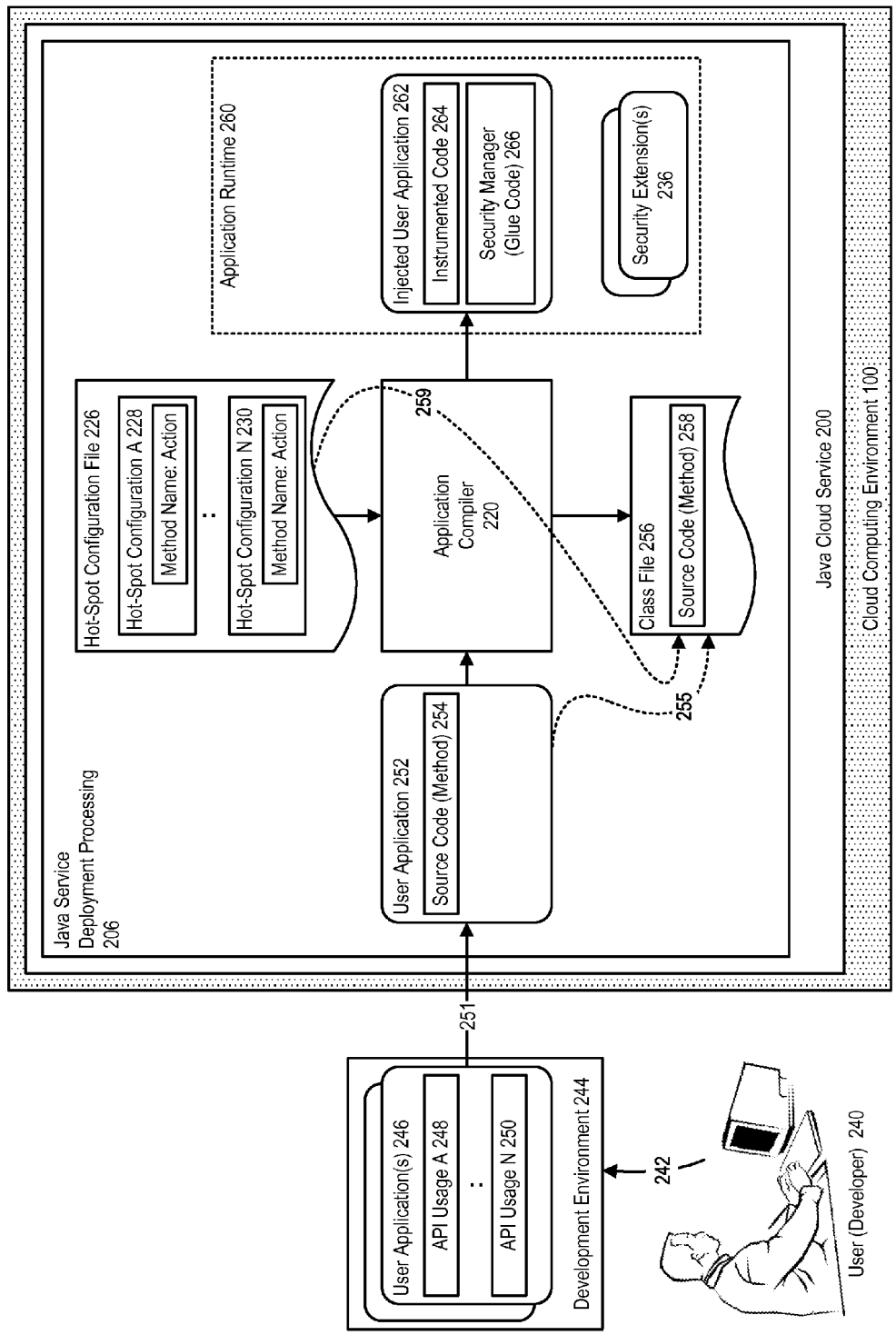
FIG. 6 further illustrates a system for providing application deployment security, in accordance with an embodiment.

FIG. 6 further illustrates a system for providing application deployment security, in accordance with an embodiment.

As shown in FIG. 6, in accordance with an embodiment, during compilation of the user application, the compiler determines, for one or more of the method invocations within the source code of the user application, any matching hot-spot configurations and associated policies and actions. The compiler can then inject the user application so that the application runtime 260 for the injected user application 262 includes a corresponding instrumented code 264 and a security manager glue code 266.

In accordance with an embodiment, the generated security manager glue code can include a method signature based on the original method signature of the input source class file. A method invocation in the input source class file can be replaced by a method generated in the security manager glue code, so that the user application will instead invoke into the security manager, which in turn calls any registered extensions after normalizing the list of provided arguments. The registered extensions can then perform the actual invocation, on behalf of the user application.

In accordance with an embodiment, the name and the static methods in the security manager glue code are changed each time a user application is injected by the application compiler, including between two instances of injection for the same application. This helps to prevent a malicious user from packaging a class that replaces the generated security manager glue code. Even if the malicious user manages to load their class in the place of generated security manager glue code, it is very unlikely the method names that are hard-wired into the malicious user application code will exist in the security manager glue code class.

In accordance with an embodiment, the security manager glue code can then be compiled and packaged together with the user application, so that it can bind the user application with extensions for validations and inspection, including taking appropriate actions for each hot-spot in the runtime.

Figure 7:
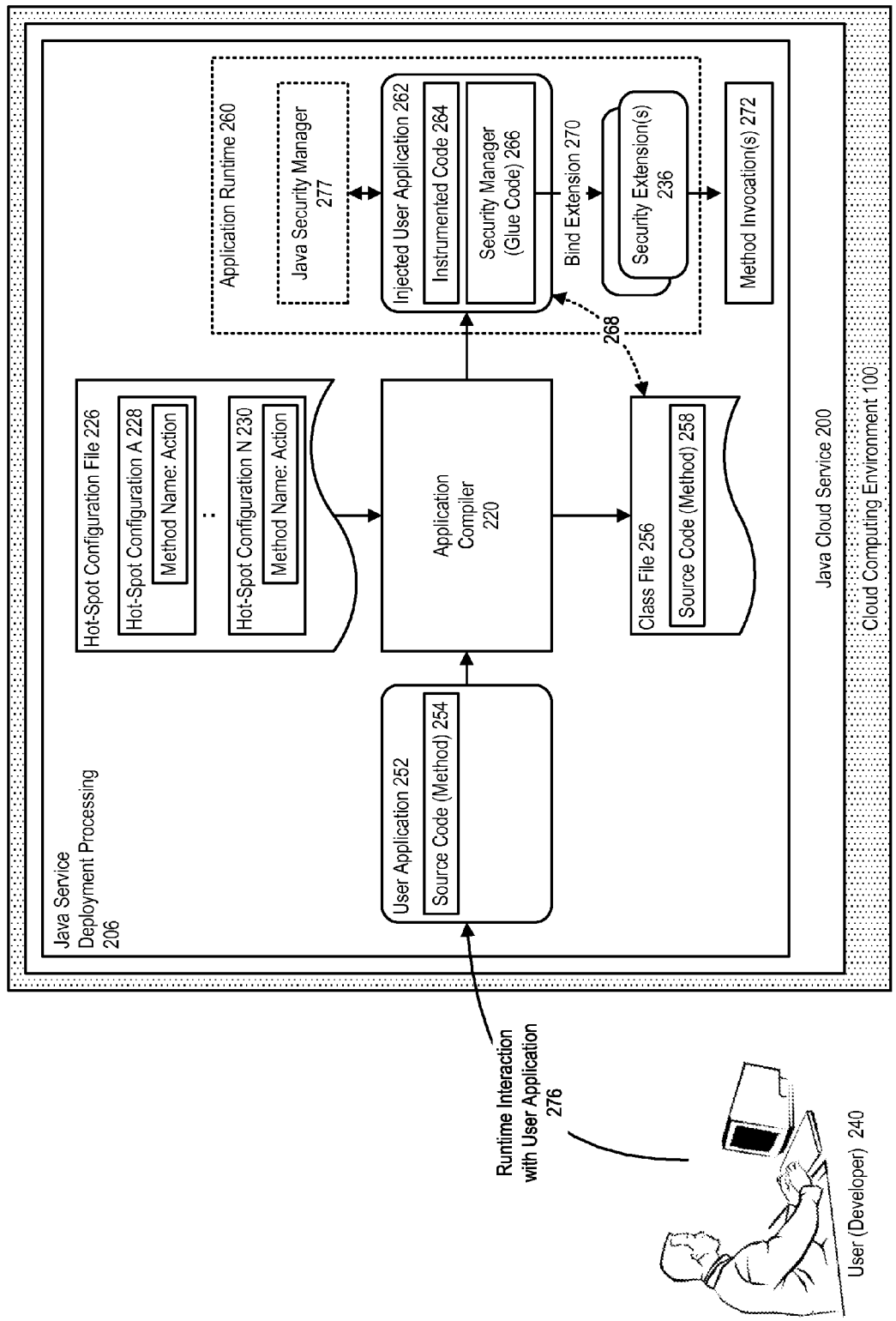
FIG. 7 further illustrates a system for providing application deployment security, in accordance with an embodiment.

FIG. 7 further illustrates a system for providing application deployment security, in accordance with an embodiment.

As shown in FIG. 7, in accordance with an embodiment, the application compiler can perform both static analysis, and runtime analysis and enforcement, which provides more surface area than whitelisting functionality alone, particularly when the application is dynamically created.

During a static phase, the compiler can identify a minimal superset of invocations matching a hot-spot configuration, which are all injected.

Subsequently, during a runtime phase, additional checks can be performed to verify that hot-spot definitions at runtime exactly match with those injected. When there is a match, the specified action is performed. Alternatively, if there is not a match, the invocation is passed through, as if no injection had been performed on that particular hot-spot.

In accordance with an embodiment, if a hot-spot can be fully identified statically (e.g., invokestatic), then the specified action can be directly performed without need for further checks in the runtime.

The user application can then be deployed as an application runtime to the cloud computing environment, including binding 270 one or more of the security extensions to the user application's security manager glue code, to thereafter enforce security, for example by deferring to the security extension to make the method invocations 272.

In many situations, an extension can perform actions by itself in a one-way manner. However, occasionally, situations may arise for which an extension cannot perform a final invocation or action without some additional information. For example, during an invoke-special-other invocation, the extension cannot perform the final action, because in this situation the calling context is important, requiring calls into the base class with super.method( ) invocations. To address such situations, in accordance with an embodiment, an injected code and extension can perform a two-way communication. In such situations, the actual method in the class file may not be replaced, and instead the security manager glue code will reference 268 the class file from the application, leaving the extension with the ability only to validate arguments and the object instance. For example, an extension may return a code to skip (JUMP) an actual method invocation. If the actual invocation was expected to return a value, the injected code can communicate with the extension to get a value and put it at the top of the stack. In some cases, the extension (after validating the parameters and the current object) may return a different code indicating that the actual invocation can proceed; alternatively the extension may determine to deny the call and, e.g., throw a SecurityException.

In accordance with an embodiment, injection is transparent to the user, who can continue to interact 276 with the application as before, but will not have access to the injected runtime code. Similarly, the injection is performed independently from the enforcement of security by the security manager and the registered security extensions. Optionally, the system can continue to operate with, and supplement or defend the operation of, existing security components, for example a standard Java security manager 277. Additionally, as described above, the compiler framework and extensions can be used to enforce security in an extensible manner in a cloud or other environment, including any Java environment.

Application Runtime Flow

Figure 8:
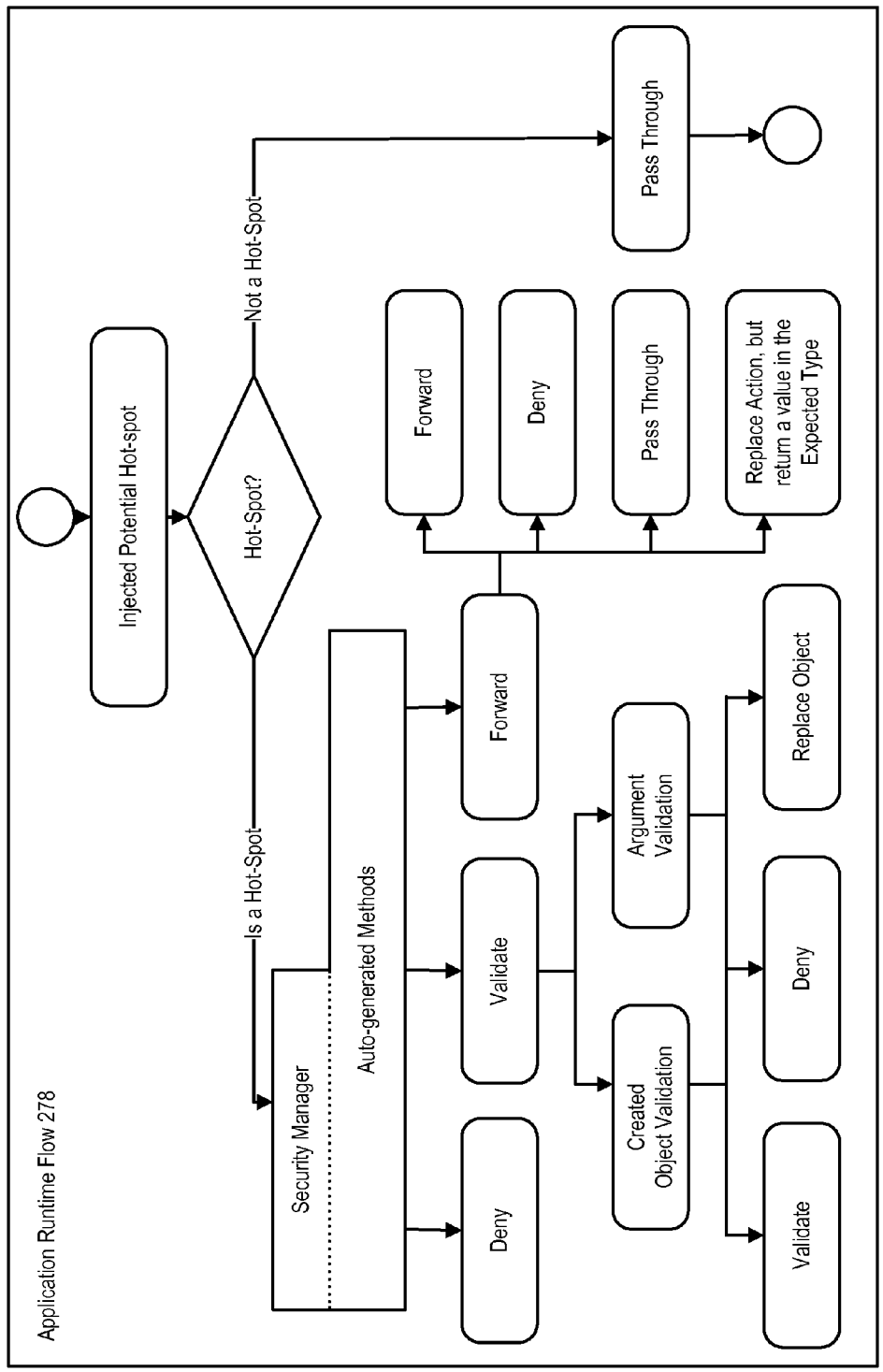
FIG. 8 illustrates an application runtime flow, in accordance with an embodiment.

FIG. 8 illustrates an application runtime flow 278, in accordance with an embodiment.

As shown in FIG. 8, in accordance with an embodiment, during the application runtime, the security manager can perform additional checks to verify that hot-spot definitions at runtime exactly match with those injected. When there is a match on a potential hot-spot, the specified action is performed; alternatively, the invocation is passed through, as if no injection had been performed on that particular hot-spot. Hot-spots can be evaluated as to whether the method invocation should be, for example, denied or forwarded, or replaced, or otherwise modified prior to execution.

Application Deployment Process

Figure 9:
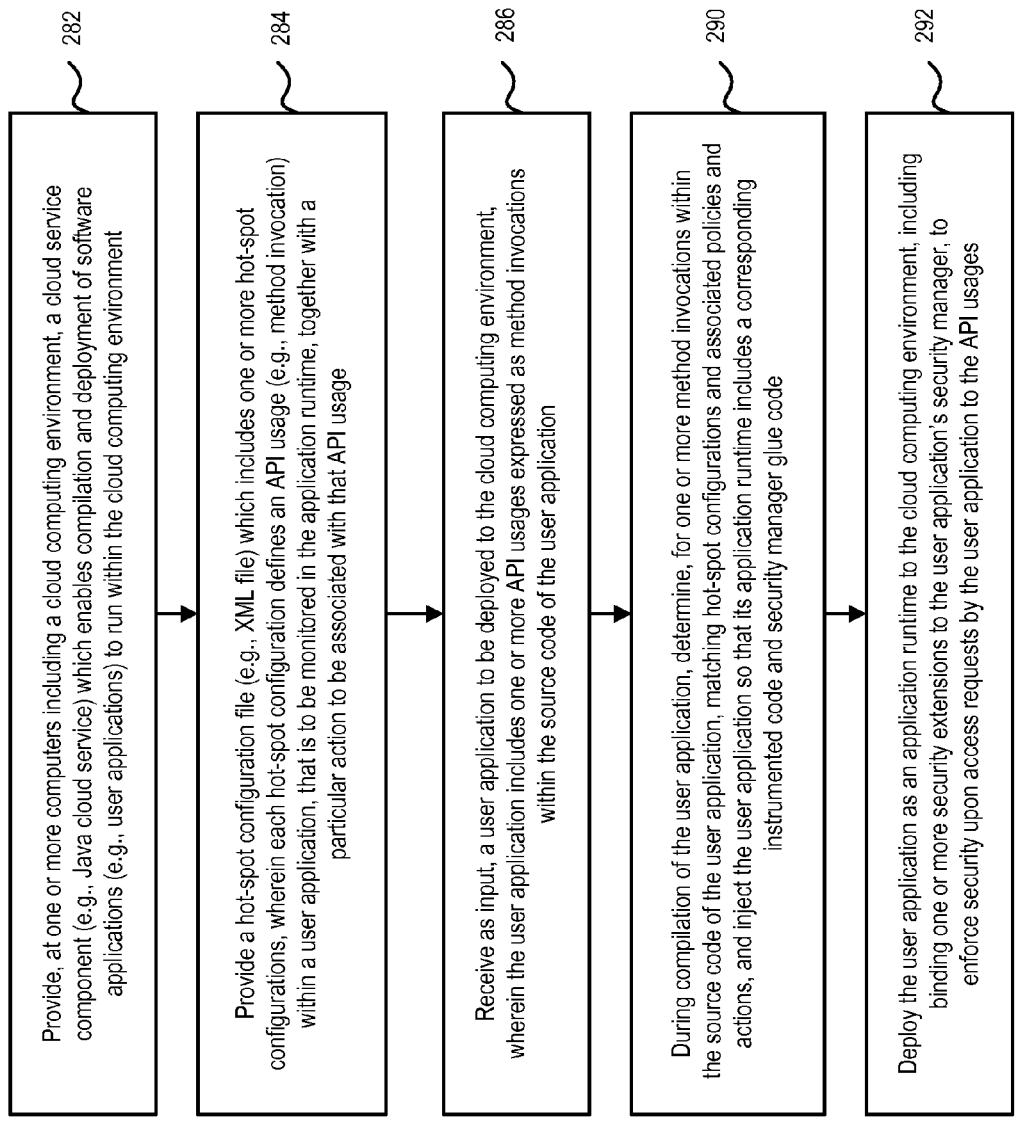
FIG. 9 illustrates a method for providing application deployment security in a cloud computing environment, including use of an application compiler, in accordance with an embodiment.

FIG. 9 illustrates a method for providing application deployment security in a cloud computing environment, including use of an application compiler, in accordance with an embodiment.

As shown in FIG. 9, in accordance with an embodiment, at step 282, one or more computers are provided with a cloud computing environment, and a cloud service component (e.g., a Java cloud service) which enables compilation and deployment of software applications (e.g., user applications) to run within the cloud computing environment.

At step 284, a hot-spot configuration file (e.g., an XML file) is provided, which includes one or more hot-spot configurations, wherein each hot-spot configuration defines an API usage within a user application (e.g., a method invocation), that is to be monitored in the application runtime, together with a particular action to be associated with that API usage.

At step 286, a user application is received as input, to be deployed to the cloud computing environment, wherein the user application includes one or more API usages expressed as method invocations within the source code of the user application.

At step 290, during compilation of the user application, the system determines, for one or more of the method invocations within the source code of the user application, matching hot-spot configurations and associated policies and actions, and injects the user application so that its application runtime includes a corresponding instrumented code and security manager glue code.

At step 292, the user application is deployed as an application runtime to the cloud computing environment, including binding one or more security extensions to the user application's security manager, to enforce security upon access requests by the user application to the API usages.

Hot-Spots

As described above, in accordance with an embodiment, hot-spots represent API usages which, for security reasons, are of interest to be monitored at runtime, such as invocations of particular methods that are likely to be used to attempt unauthorized access. Hot-spots can be defined within a hot-spot configuration file, for example in XML or another format, which can include one or more hot-spot configurations. Each hot-spot configuration can be associated with an owner and/or method signature, and can define an API usage within a user application which is to be monitored in the application runtime, together with a particular policy or set of actions to be associated with that API usage.

In accordance with an embodiment, hot-spot configurations are also implicitly handled for reflections.

Examples of hot-spot configurations, and the types of usage they can select, include:

invoke-static—which can be used to select static method invocations.

invoke-virtual—which can be used to select virtual invocations. A hot-spot configuration for intercepting method-.invoke( ) invocations is automatically added to handle reflections.

invoke-interface—which can be used to select invocations on an interface. Each invoke-interface hot-spot configuration can be automatically copied into invoke-virtual since the user could call the same method through an interface, or through an object of a class implementing the interface.

invoke-special—which can be used to select special cases depending upon the context in which an operation is used, various examples of which are described below.

invoke-special-new—which can be used to select object creation. A hot-spot configuration to monitor Construction.newInstance( ) can be automatically added to check creation of objects using reflection.

invoke-special-constructor—which can be used to select situations where a subclass constructor calls a superclass constructor. A finalize method can be injected into class files whose instantiation is not allowed or inspected, to ensure that a malicious user cannot access an instance that was denied on the finalize method of the class. It may also be necessary to guard against de-serializing an object of a class whose instantiation is not allowed or inspected.

invoke-special-final—which can be used to select situations where the method is a final method or where the owner is final. These methods are treated like invoke-virtual methods, since they can also be invoked via reflection. Each invoke-special-final configuration is automatically copied into invoke-virtual, since the user could call the same method through invoke virtual.

invoke-special-other—which can be used to select protected and private methods that are not final methods.

The above-described hot-spot configurations are provided by way of example, to illustrate a particular embodiment. In accordance with other embodiments, other types of hot-spot configurations can be used.

Actions

As described above, in accordance with an embodiment, each hot-spot configuration can be associated with an owner and/or method signature, and can define an API usage within a user application which is to be monitored in the application runtime, together with a particular policy or set of actions to be associated with that API usage. In accordance with an embodiment, each hot-spot configuration can specify exactly one action for each policy, which the application compiler can then perform depending upon the particular hot-spot invocation type.

Examples of various actions that can be specified against a hot-spot include:

Deny-Inline—with this action, an AccessControl exception is thrown just before a method invocation.

Deny-Replace—with this action, the method is replaced by another, replacement method from the security manager glue code. The replacement method can deny the call after performing some work, such as logging or alerting. The signature of the replacement method consumes all of the required objects from the stack. For a non-static method, the replacement method will contain the owner instance as the first argument, followed by the rest of the arguments. For a static method, the list of arguments will exactly match with those of the replaced method.

Forward—with this action, which is intended mainly for static, virtual or final invocations, a method invocation can be forwarded to another method or to an invocation handler, along with the context of the invocation. It is left up to the "invoke" method on the invocation handler to grant or deny the call.

ExamineObject—with this action, which is intended mainly for instances being created, objects that are created with a new( ) operator can be examined using an interceptor. The object can be validated only after the object is fully created, but before the object is returned to the application. New object creation can also be effective handled by intercept handlers.

Intercept—with this action, which is intended mainly for new( ), private, and protected method invocations, including non-final invoke special method invocations, the handler gets the call back with an invocation context that contains access to the current instance and the list of parameters and the method name. The handler can change the argument values, but cannot call the actual method using reflection. The handler can return true to permit the actual invocation, in which case another call is made to the handler to validate the return object. If the method returns false, then the actual invocation in the byte code will not be execute; instead the intercept is expected to set a return object in the invocation context.

Fail—this action fails the application compiler process statically, and the application will be rejected and not deployed.

The above-described actions are provided by way of example, to illustrate a particular embodiment. In accordance with other embodiments, other types of actions can be used.

Matching Rules

In accordance with an embodiment, the process of identifying and acting upon a potential hot-spot can be performed in phases, using matching rules. During a static phase, the system can identify a minimal superset of invocations matching a hot-spot configuration, which are all injected. During a runtime phase, additional checks can be performed to verify that hot-spot definitions exactly match with those injected. When there is a match, the specified action is performed. Alternatively, if there is not a match, the invocation is passed through, as if no injection had been performed on that particular hot-spot. Examples of matching rules include:

static-class-match—this is a Boolean valued attribute. When this attribute is true, the owner of the invocation is statically matched and the injection action directly performed; when not true, the injection is effectively performed with an "IF" condition to check if the owner instance is actually an instance of the class name given in the configuration.

all-overloads—this is a Boolean valued attribute. When this attribute is true, all of the methods are matched with the method name.

args-match-policy—this is an enumeration type, which indicates how the arguments of a method must be matched. The attribute all-overloads must be false when this policy is specified. Supported values include EXACT, in which case the arguments size, order and the type must match; and PARTIAL, in which case any given arguments in the configuration must match the same order, although the actual invocation in the class may have more arguments.

examine-at-return—this is a Boolean valued attribute. This attribute is supported by invoke-special-constructor type instructions. When the control is inside a constructor, and an action wants to validate the current object being created, a validation handler can be invoked at the start of the constructor or at the end of the constructor. By default, the validation handler is invoked just after invoking superclass constructor. When this attribute is true, the validation handler is invoked when the constructor is about to return normally.

In accordance with an embodiment, the application compiler understands regular expressions in order to perform its matching. However, the use of regular expressions in an XML file can affect readability.

To address this, in accordance with an embodiment, the XML configuration file supports the use of wild cards to indicate class types, method names, and/or argument types. These values can then be translated into regular expressions understandable by the application compiler, by applying the following rules:

In the hot-spot configuration "*", which means anything without a dot, is translated into the regular expression "[^.]*" for further use by the application compiler.

In the hot-spot configuration "**", which means anything that includes a dot, is translated into the regular expression ".*" for further use by the application compiler.

In the hot-spot configuration "[ ]" (i.e., an array notation), which means an array, is escaped and translated into the regular expression "\[\]" for further use by the application compiler.

In the hot-spot configuration "." (i.e., a dot), which means a dot, is escaped and translated into the regular expression "\." for further use by the application compiler.

The above rules enable a user to, for example, indicate a class name in a hot-spot configuration, which is then translated into "[^]*" before the string is treated as a regular expression. Other regular expression features, such as "|" (meaning "or"), can be used with their original regular expression semantics, for example:

The expression <arg>byte [ ]</arg> which matches with the "byte" array type, since the "[ ]" is escaped.

The expression <arg>**</arg> which matches with any fully qualified class name, including those that include dots.

The expression <arg>java.lang.*</arg> which matches with those classes that are directly under the "java.lang" package, but will not match with, for example, "java.lang.some.AnotherClass".

The expression <methodname>load|loadLibrary</methodname> which matches with either of the methods "load", or "loadLibrary".

The expression <methodname>set*</methodname> which matches with all setters.

In accordance with an embodiment, the XML configuration file also supports the use of global properties, which can be inherited by any invocation configuration element. For example, a property value can include variables that are of the form ${variable}, where the variable can be the name of a previously defined property or a java-system property. These variables will then be resolved before supplied to the handler. In a particular example, a property "cloud.appc.generation.id" can be populated with a unique identifier for each injection/glue code generation.

In accordance with an embodiment, invocation handlers can access all of the properties defined as part of a configuration, by implementing an InvocationContextReceiver interface.

The above-described matching rules are provided by way of example, to illustrate a particular embodiment. In accordance with other embodiments, other types of matching rules can be used.

Post-Injection Repackaging

As described above, in some instances the security manager glue code may reference the class file from the application, leaving the extension with the ability only to validate arguments and the object instance. This generally requires the application compiler to build a classpath to compile the generated security manager glue code. The application compiler can automatically include all of the paths from the application, in the classpath.

In other instances, the security manager glue code may reference a class from a shared library, in which case it may be desirable that the class-path contains classes from the shared-library.

To support such scenarios, in accordance with an embodiment, the application compiler supports an argument for passing an additional classpath. In accordance with an embodiment, the byte code can be generated directly to avoid this compilation step. Since the generated security manager glue code may reference the user code, the class-loading requirements should be considered before determining where to package the generated security manager glue code.

In accordance with an embodiment, a single security manager glue code source file is generated for every module in an application. This can result in multiple class files since the source code defines anonymous inner classes for each module. The security manager glue code class can be packaged along with the module. In accordance with an embodiment, the cloud computing environment can support WAR and EAR types of deployment. An EAR can contain EJB-JARs.

Web modules: in accordance with an embodiment, classes from WEB-INF/classes and WEB-INF/lib/*.jar are all injected. The compiled security manager glue code is packaged as a jar file and added into WEB-INF/lib directory.

EJB-JAR modules: in accordance with an embodiment, all of the **.class are injected. The security manager glue code classes are packaged directly into the JAR.

EAR modules: in accordance with an embodiment, each module is injected separately. For example, *.war are all injected one by one; and *.jar are all injected one by one. The APP-INF/lib/*.jar and APP-INF/classes are together injected and the security manager glue code for this is placed into APP-INF/lib.

In accordance with an embodiment, the name of the security manager glue code will be different for different modules, and will change next time the same application is injected. As described above, this helps to prevent a malicious user from packaging a class that replaces the generated security manager glue code. Even if the malicious user manages to load their class in the place of generated security manager glue code, it is very unlikely the method names that are hard-wired into the malicious user application code will exist in the security manager glue code class.

Exemplary Application Deployment

The following section illustrates an exemplary application deployment, and is provided for purposes of illustrating the techniques described above.

FIG. 10 illustrates an example hot-spot configuration 304, in accordance with an embodiment.

In the example illustrated in FIG. 10, a hot-spot configuration policy for exit methods such as (<methodname>exit </methodname>) indicates that such invocations are to be denied with a replacement (<deny-replace/>) action.

FIG. 11 illustrates an example input source code 308, in accordance with an embodiment.

In the example illustrated in FIG. 11, the input source code includes a call to a system exit method (system.exit(0)) in certain circumstances, which potentially matches the configured hot-spot illustrated in FIG. 10 as described above.

FIG. 12 illustrates an example instrumented code 312, in accordance with an embodiment.

In the example illustrated in FIG. 12, the system.exit call within the original input source code can be denied and replaced with a call to a security manager glue code, in this example GeneratedGlueCode._deny_POLICY_ID_100 with arguments (I)V).

FIG. 13 illustrates an example security manager glue code 316, in accordance with an embodiment.

In the example illustrated in FIG. 13, the corresponding deny_POLICY_ID_100 (int arg0) indicates that the system should throw an exception on the invoked method "System.exit( ) cannot be executed on the cloud."

Forwarding to Invocation Handlers or Object Validators

As described above, in accordance with an embodiment, the application compiler can hook custom invocation handlers and object validators, which can be registered based on their specification in the XML configuration file. Invocation handlers can be registered for invoke-static, invoke-virtual, and invoke-special-final types rules. The forwarding action provides the highest level of control to the handler handling the action, since the handler gets complete access to the method invocation context, such as the list of argument values, together with the target object on which the method is invoked. Object validators can be registered for invoke-special-new, and invoke-special-constructor type rules.

FIG. 14 illustrates an example hot-spot configuration 320 which supports use of forwarding, in accordance with an embodiment.

As shown in FIG. 14, in accordance with an embodiment, if it is desired to get a callback whenever an, e.g., System.getProperty( ) is called, the illustrated rule (<methodname>getProperty</methodname>) can be used. The forward class can be a factory as defined in the API.

The above-described invocation handlers and object validators are provided by way of example, to illustrate a particular embodiment. In accordance with other embodiments, other types of invocation handlers and object validators can be used.

Embodiments of the present invention may be conveniently implemented using one or more conventional general purpose or specialized digital computer, computing device, machine, or microprocessor, including one or more processors, memory and/or computer readable storage media programmed according to the teachings of the present disclosure. Appropriate software coding can readily be prepared by skilled programmers based on the teachings of the present disclosure, as will be apparent to those skilled in the software art.

In some embodiments, the present invention includes a computer program product which is a non-transitory storage medium or computer readable medium (media) having instructions stored thereon/in which can be used to program a computer to perform any of the processes of the present invention. Examples of the storage medium can include, but is not limited to, any type of disk including floppy disks, optical discs, DVD, CD-ROMs, microdrive, and magneto-optical disks, ROMs, RAMs, EPROMs, EEPROMs, DRAMs, VRAMs, flash memory devices, magnetic or optical cards, nanosystems (including molecular memory ICs), or any type of media or device suitable for storing instructions and/or data.

The foregoing description of embodiments of the present invention has been provided for the purposes of illustration and description. It is not intended to be exhaustive or to limit the invention to the precise forms disclosed. Many modifications and variations will be apparent to the practitioner skilled in the art. The embodiments were chosen and described in order to best explain the principles of the invention and its practical application, thereby enabling others skilled in the art to understand the invention for various embodiments and with various modifications that are suited to the particular use contemplated.

What is claimed is:

1. A system for providing application deployment security in a cloud computing or other environment, comprising:
one or more computers, including a computing environment which enables compilation and deployment of software applications to run within the computing environment;
a plurality of hot-spot configurations associated with application programming interface (API) usages, wherein each hot-spot configuration defines an API usage that is to be monitored, and associates at least one of a particular policy or action with that API usage;
one or more security extensions that are registered with an application compiler framework, for selective binding to user applications at runtime; and
an application compiler provided as part of the application compiler framework, which receives a user application to be deployed to the computing environment,
wherein the user application includes one or more of the API usages expressed as method invocations within the source code of the user application,
determines, for each of the API usages expressed as method invocations within the source code of the user application, one or more matching hot-spot configurations and associated policies and actions, and
injects the user application during compilation to create an application runtime that includes a corresponding instrumented code and a security manager that, during execution of the user application, monitors the method invocations that are invoked by the user application, for use in determining access by the user application to the API usages;
whereupon deployment of the application runtime to the computing environment,
the user application is bound to at least one security extension registered with the application compiler framework,
for use by the security manager in calling the at least one security extension, for use with the user application.

2. The system of claim 1, wherein the plurality of hot-spot configurations is defined by an editable configuration file.

3. The system of claim 1, wherein the security manager communicates with the at least one security extension to perform the method invocations on behalf of the user application, including granting or denying access by the user application to the API usages expressed as method invocations.

4. The system of claim 1, wherein the application compiler uses a set of rules to translate hot-spot configuration expressions defined in an editable format into regular expressions understandable by the application compiler.

5. The system of claim 1, further comprising a standard security manager that enforces permissions granted to classes within the application runtime, and wherein the application compiler supplements operation of the standard security manager in enforcing the permissions.

6. The system of claim 1, wherein the application compiler and the one or more security extensions are provided within a Java computing environment, and enforce security in an extensible manner within the Java computing environment.

7. The system of claim 1, wherein each of one or more method invocations within the source code of the user application is replaced with an invocation into the security manager, which calls the at least one security extension to perform a method invocation on behalf of the user application.

8. A method of providing application deployment security in a cloud computing or other environment, comprising:
providing one or more computers, including a computing environment which enables compilation and deployment of software applications to run within the computing environment;
providing a plurality of hot-spot configurations associated with application programming interface (API) usages, wherein each hot-spot configuration defines an API usage that is to be monitored, and associates at least one of a particular policy or action with that API usage;
registering one or more security extensions with an application compiler framework, for selective binding to user applications at runtime; and
compiling a user application, to be deployed to the computing environment, including receiving the user application to be deployed to the computing environment,
wherein the user application includes one or more of the API usages expressed as method invocations within the source code of the user application,
determining, for each of the API usages expressed as method invocations within the source code of the user application, one or more matching hot-spot configurations and associated policies and actions, and
injecting the user application during compilation to create an application runtime that includes a corresponding instrumented code and a security manager that, during execution of the user application, monitors the method invocations that are invoked by the user application, for use in determining access by the user application to the API usages;
whereupon deployment of the application runtime to the computing environment,
the user application is bound to at least one security extension registered with the application compiler framework,
for use by the security manager in calling the at least one security extension, for use with the user application.

9. The method of claim 8, wherein the plurality of hot-spot configurations is defined by an editable configuration file.

10. The method of claim 8, wherein the security manager communicates with the at least one security extension to perform the method invocations on behalf of the user application, including granting or denying access by the user application to the API usages expressed as method invocations.

11. The method of claim 8, further comprising using a set of rules to translate hot-spot configuration expressions defined in an editable format into regular expressions understandable by the application compiler.

12. The method of claim 8, further comprising providing a standard security manager that enforces permissions granted to classes within the application runtime, and wherein the application compiler supplements operation of the standard security manager in enforcing the permissions.

13. The method of claim 8, wherein the application compiler and the one or more security extensions are provided within a Java computing environment, and enforce security in an extensible manner within the Java computing environment.

14. The method of claim 8, further comprising replacing each of one or more method invocations within the source code of the user application with an invocation into the security manager, which calls the at least one security extension to perform a method invocation on behalf of the user application.

15. A non-transitory computer readable storage medium, including instructions stored thereon which when read and executed by one or more computers cause the one or more computers to perform the steps comprising:

providing, at one or more computers, a computing environment which enables compilation and deployment of software applications to run within the computing environment;

providing a plurality of hot-spot configurations associated with application programming interface (API) usages, wherein each hot-spot configuration defines an API usage that is to be monitored, and associates at least one of a particular policy or action with that API usage;

registering one or more security extensions with an application compiler framework, for selective binding to user applications at runtime; and compiling a user application, to be deployed to the computing environment, including receiving the user application to be deployed to the computing environment, wherein the user application includes one or more of the API usages expressed as method invocations within the source code of the user application, determining, for each of the API usages expressed as method invocations within the source code of the user application, one or more matching hot-spot configurations and associated policies and actions, and injecting the user application during compilation to create an application runtime that includes a corresponding instrumented code and a security manager that, during execution of the user application, monitors the method invocations that are invoked by the user application, for use in determining access by the user application to the API usages:

whereupon deployment of the application runtime to the computing environment, the user application is bound to at least one security extension registered with the application compiler framework, for use by the security manager in calling the at least one security extension, for use with the user application.

16. The non-transitory computer readable storage medium of claim 15, wherein the plurality of hot-spot configurations is defined by an editable configuration file.

17. The non-transitory computer readable storage medium of claim 15, wherein the security manager communicates with the at least one security extension to perform the method invocations on behalf of the user application, including granting or denying access by the user application to the API usages expressed as method invocations.

18. The non-transitory computer readable storage medium of claim 15, further comprising using a set of rules to translate hot-spot configuration expressions defined in an editable format into regular expressions understandable by the application compiler.

19. The non-transitory computer readable storage medium of claim 15, further comprising providing a standard security manager that enforces permissions granted to classes within the application runtime, and wherein the application compiler supplements operation of the standard security manager in enforcing the permissions.

20. The non-transitory computer readable storage medium of claim 15, wherein the application compiler and the one or more security extensions are provided within a Java computing environment, and enforce security in an extensible manner within the Java computing environment.

\* \* \* \* \*

UNITED STATES PATENT AND TRADEMARK OFFICE
CERTIFICATE OF CORRECTION

PATENT NO.       : 9,871,800 B2
APPLICATION NO.  : 14/610524
DATED            : January 16, 2018
INVENTOR(S)      : Subramanian et al.

It is certified that error appears in the above-identified patent and that said Letters Patent is hereby corrected as shown below:

In the Specification

Column 4, Line 63, delete "(System.out.println)." and insert -- (System.out.println) --, therefor.

Column 10, Line 32, delete ""[^]*"" and insert -- "[^.]*" --, therefor.

Column 12, Line 12, delete "(I)V)." and insert -- (I)V. --, therefor.

In the Claims

Column 16, Line 7, in Claim 15, delete "usages:" and insert -- usages; --, therefor.

Signed and Sealed this
Second Day of July, 2019

Andrei Iancu
*Director of the United States Patent and Trademark Office*